March 23, 1937.  J. SACHS  2,074,862

ELECTRICAL DISTRIBUTION DEVICE

Original Filed Jan. 30, 1935  2 Sheets-Sheet 1

Inventor
Joseph Sachs
By S. Jay Teller
Attorney

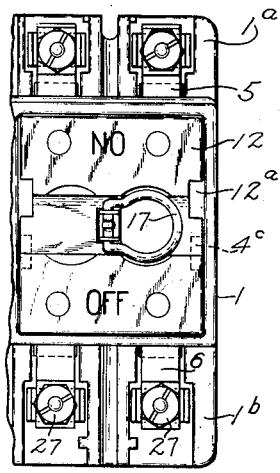
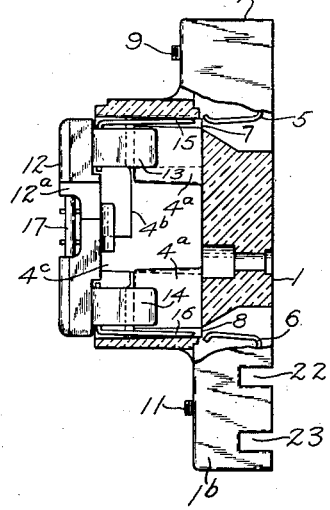
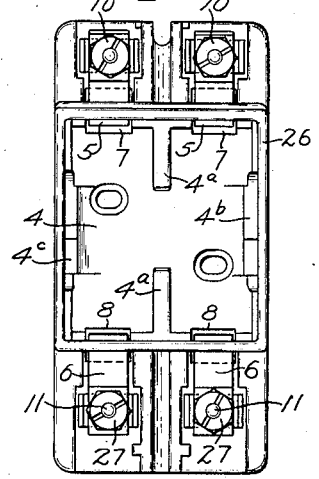
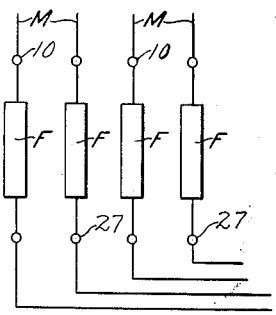
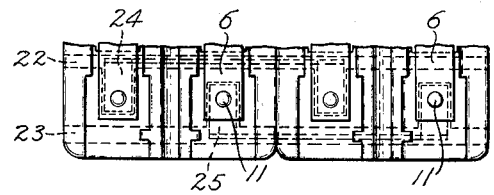
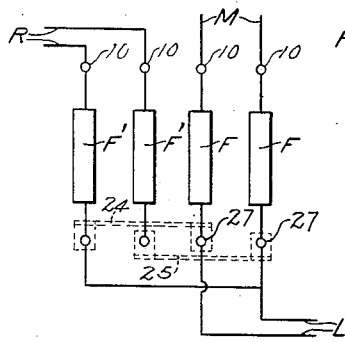
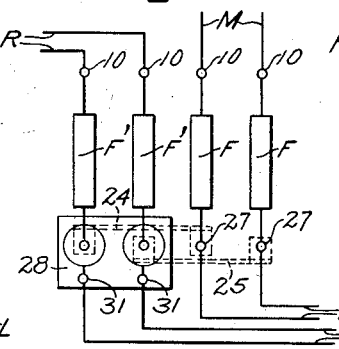
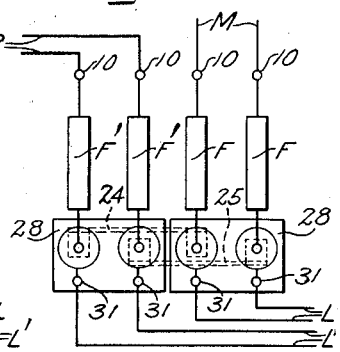

Patented Mar. 23, 1937

2,074,862

UNITED STATES PATENT OFFICE 2,074,862

ELECTRICAL DISTRIBUTION DEVICE

Joseph Sachs, West Hartford, Conn.

Original application January 30, 1935, Serial No. 4,015. Divided and this application December 19, 1935, Serial No. 55,291

8 Claims. (Cl. 200—133)

The invention is particularly applicable to an electric circuit controlling device which includes a suitable switch and also main fuses. The primary object of the invention is to provide as a part of such a device suitable conductors which are adapted to serve interchangeably either for the attachment of wire terminals or for the attachment of a supplemental fuse block carrying branch circuit fuses. Other objects of the invention will be apparent from the following specification and claims.

This application constitutes a division of my co-pending application for Electric circuit controlling device, Serial No. 4,015, filed January 30, 1935.

In the accompanying drawings one embodiment of the invention is disclosed, but it will be understood that the drawings are intended for illustrative purposes only and are not to be construed as defining or limiting the scope of the invention, the claims forming a part of this specification being relied upon for that purpose.

Of the drawings:

Fig. 6 is a fragmentary front view showing one of the fuse carriers in its inverted or upside down position.

Fig. 7 is a combined side and sectional view of the base and fuse carrier, the latter being in its upside down position.

Fig. 8 is a front view of an alternative form of main base adapted to receive only a single fuse carrier.

Fig. 9 is a fragmentary front view of the bottom portions of two single bases like the base shown in Fig. 8 and showing in dotted lines the transverse electrical connections between them at the rear thereof.

Figs. 10, 11, 12 and 13 are diagrammatic views showing some of the electrical connections that may be obtained by means of a device embodying the invention.

Figure 1:
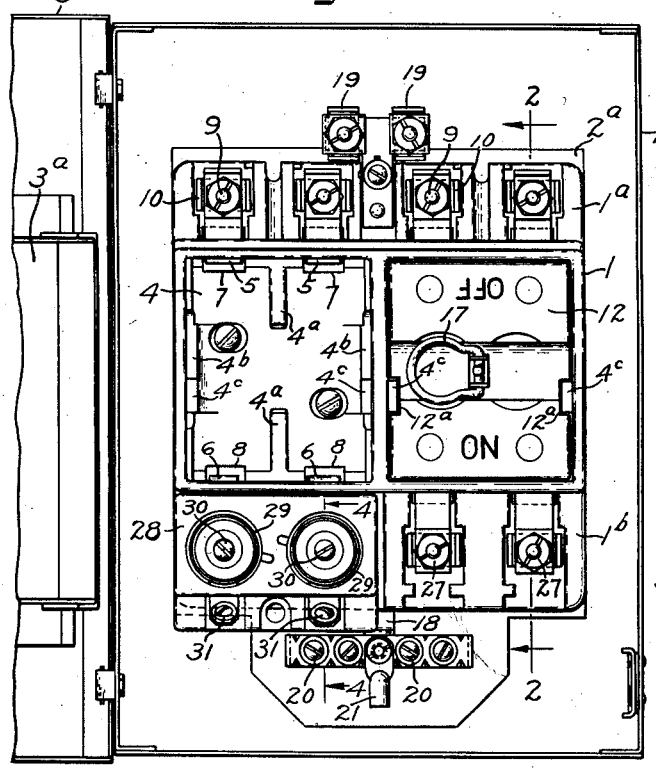
Fig. 1 is a front view of an electric circuit controlling device embodying the invention, one of the two removable fuse carriers being removed in order that parts of the base may more clearly appear.

So far as the present invention is concerned the details of the switch mechanism and of the main fuses and their supporting means may be widely varied. However, the present invention is well adapted to be used in conjunction with or as a part of the device disclosed in my before mentioned co-pending application. The said device is shown in the drawings, and will now be briefly described.

In the drawings 1 represents a main insulating base which is adapted to be secured to a suitable rear supporting wall, as for instance the rear wall of an enclosing cabinet 2. An insulating sheet 2ᵃ may be interposed if desired. The cabinet 2 may be provided with a hinged cover 3, and preferably the cover 3 is provided with an opening which permits access to the fuses in the box without opening the cover. This opening in the main cover is adapted to be closed by an auxiliary cover 3ᵃ.

The base 1 is provided with at least one recess 4 adapted to receive a removable fuse carrier, and as shown in Fig. 1 there are two such recesses arranged side by side. Each recess 4 is closed or substantially closed at the top, bottom and both sides and also the rear but is open at the front.

Carried by the main base near the rear thereof is at least one pair of electrical contacts 5 and 6, and preferably there are two pairs of contacts associated with each of the recesses 4. Formed at the rear of each of the recesses 4 are openings or slots 7, 7 and 8, 8 which are in register with the respective contacts 5, 5 and 6, 6 as clearly shown in Figs. 1 and 2.

The base 1 is provided with an upward projecting ledge 1ᵃ and an integral portion of each contact 5 extends upward along the front of this ledge and is held in place by a forward extending screw 9. Also held by the screw 9 is a wire terminal 10. The base 1 is also provided with a downward projecting ledge 1ᵇ and an integral portion of each contact 6 extends downward along the front face of this ledge. Means accessible from the front of the ledge and supported by the base are used to hold the downward extending portion of the contact 6 in place. For this purpose I have shown a forward extending screw 11, the forward end of which is accessible from the front of the ledge. The forward end of this screw may serve for holding a wire terminal or an auxiliary fuse block, as will be hereinafter more fully explained.

Fuse carriers 12 are provided which are preferably of insulating material and which are adapted to enter and approximately fit the respective recesses 4 in the base 1. Each fuse carrier 12 is provided on its rear face with at least one pair of contacts 13 and 14 adapted to receive a cartridge or other fuse, and preferably there are two pairs of such contacts on each fuse carrier. Also carried by each fuse carrier is at least one pair of conducting blades or prongs 15 and 16 which are electrically connected with the corresponding fuse contacts. When there are two pairs of fuse contacts there are two pairs of conducting prongs. The fuse carrier is preferably provided at the front with a suitable pivoted handle 17 by means of which the carrier may be conveniently withdrawn from the recess.

The base 1 may be provided with integral barriers 4ª, 4ª located within the recess 4 and positioned between the respective fuse contacts when the carrier 12 is in its normal position. Ledges 4ᵇ, 4ᵇ are provided to act as stops to limit inward movement of the carrier.

Figure 2:
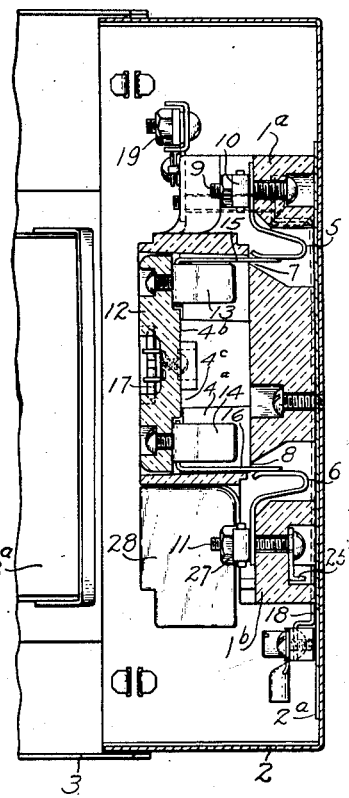
Fig. 2 is a vertical sectional view taken along the line 2—2 of Fig. 1.

When the carrier is in upright position in the recess, as shown in Fig. 2, the conducting prongs 15 and 16 of each pair engage respectively with the corresponding stationary contacts 5 and 6, and in this manner a circuit through the device is established, provided of course that there are fuses in place in the several contacts 13 and 14. The fuses are concealed and access can be had to them for purposes of inspection or replacement only by entirely removing the fuse carrier from the base and thus withdrawing the prongs 15 and 16 from the contacts 5 and 6 so as to break the circuit and completely disconnect the fuses.

The removable fuse carrier may be withdrawn from the recess in the base not only for the purpose of inspecting or renewing the fuses but also for the purpose of breaking the circuit. I prefer to provide the base and the carrier with ribs and grooves which are adapted to fit each other when the carrier is upright but which interfere with each other and prevent entry of the carrier when it is upside down. As shown, the base is provided with two opposite ribs 4ᶜ, 4ᶜ and the carrier 12 is provided with corresponding grooves 12ª, 12ª in which the ribs are positioned when the carrier is in its normal upright position. The ribs and grooves are spaced away from the horizontal median plane of the carrier and the recess, and the result is that when the carrier is turned upside down, as shown in Figs. 6 and 7, the ribs and grooves are out of register with each other and the forward ends of the ribs engage directly with the rear face of the carrier to prevent it from entering the recess. The fuse contacts 13 and 14 and the prongs 15 and 16 may enter the recess 4, but the prongs cannot enter far enough to establish electrical connection with the stationary contacts 5 and 6. The prongs 15 and 16 engage the end walls of the recess 4 sufficiently to hold the carrier and associated parts in place and prevent it from falling out. It will be observed and understood that there is a sufficient clearance between the front of the base 1 and the cover 3 to permit the fuse carrier to occupy the forward position shown in Fig. 7.

If desired, the base 1 may have provision for the mounting thereon of a neutral conductor and suitable wire terminals therefor. As shown, there is a neutral conductor 18 which is centrally positioned and extends from the top to the bottom of the block near the rear thereof. It is provided at the top with wire terminals 19, 19 and at the bottom with wire terminals 20, 20 and 21.

For certain wiring arrangements it is desirable to provide transverse electrical connections. While no specific form or location of conductor is necessary, I have illustrated the base 1 as being provided near the bottom with transverse rear grooves 22 and 23. A transverse conductor 24 is positioned in the groove 22 and serves to electrically connect the first and third screws 11 and the corresponding parts in the same legs of the circuit. A transverse conductor 25 is positioned in the groove 23 and serves to connect the second and fourth screws 11 and the corresponding parts in the same legs of the circuit.

In Fig. 8 I have shown an insulating base 26 which is similar to the base 1, except that it is adapted for only two legs of a circuit instead of four legs of a circuit. The construction is otherwise similar and further description is unnecessary.

Figure 3:
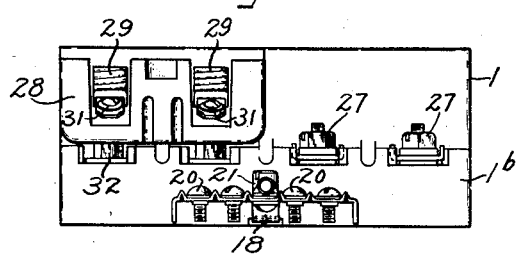
Fig. 3 is a bottom view of the insulating base and of the various parts carried thereby.
Figure 4:
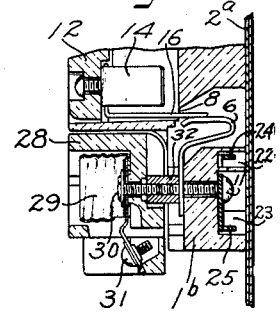
Fig. 4 is a fragmentary sectional view taken along the line 4—4 of Fig. 1.
Figure 5:
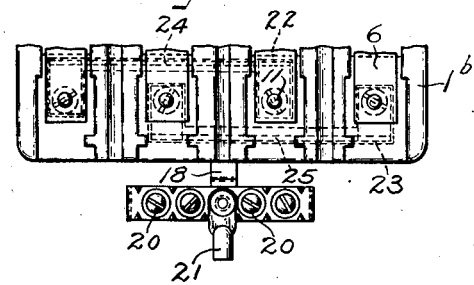
Fig. 5 is a fragmentary front view of the main base and showing in dotted lines the transverse electrical connections at the rear thereof.

Two bases 26 may be placed side by side, as shown in Fig. 9, to provide a four leg arrangement similar to that shown in Figs. 1, 3 and 4. If transverse connections are desired conductors 24 and 25 may be used similar to those shown in Figs. 4 and 5.

The screws 11 which hold the contacts 6 in place may also serve as devices for holding wire terminals 27, 27, as shown at right side of Fig. 1 and as also shown in Fig. 2. Alternatively, the screws or devices 11 may be used for holding a supplemental fuse block 28, as shown at the left side of Fig. 1 and as also shown in Fig. 4. The fuse block 28 is provided with contacts 29 and 30 adapted to receive plug fuses. Wire terminals 31, 31 are connected with the threaded shell contacts 29, 29. Adapters are provided which may be electrically and mechanically connected to the devices 11. As shown, relatively long bushings or nuts 32, constituting the adapters in the specific embodiment illustrated, are engaged with the front ends of the screws 11, and the screws 30 forming the center fuse contacts engage the same bushings 32. In this manner the fuse block 28 is held and supported in place and is electrically connected.

It will be understood that the supplemental fuse block 28 may be entirely omitted if desired, or that when provided it may be positioned at either side of a block, or that there may be two similar supplemental fuse blocks. Some of the wiring connections that are possible are indicated in the diagrammatic Figs. 10 to 13. In each of these figures the neutral connection is omitted for the sake of simplicity.

Fig. 10 shows an arrangement without any supplemental fuse blocks and without any transverse connections between different legs of the circuit. The several fuses F may be regarded as constituting two sets of main line fuses.

In Fig. 11 the main line wires are connected with the fuses F, F at the right and a lighting or other load circuit L may be connected with the wire terminals 27, 27. By means of the transverse conductors 24 and 25 the fuses F', F' are connected in series with the fuses F, F and may serve for another load circuit such as a range circuit R.

In Fig. 12 the arrangement is similar to that shown in Fig. 11 with the exception that a supplemental fuse block 28 is added and a second load circuit L' is connected to the terminals 31, 31 thereof.

In Fig. 13 the arrangement is similar to that in Fig. 12 except that there are two supplemental fuse blocks 28, the two load circuits L and L' being connected with the wire terminals 31, 31 of the respective blocks.

It will be understood that still other wiring arrangements are possible with my novel construction, but those illustrated will sufficiently exemplify the possibilities.

What I claim is:

1. In an electrical distribution device, the combination of an insulating base having fuse receiving contacts thereon and having at one end a ledge adapted to support a supplemental fuse block, wire terminals at the opposite end of the base electrically connected with the fuse contacts at the said end, and devices supported by said ledge and having at least a portion thereof accessible from the front of the ledge, the devices being electrically connected with the corresponding fuse contacts and adapted alternatively for the direct electrical and mechanical connection of wire terminals or for the electrical and mechanical connection of a supplemental fuse block.

2. In an electrical distribution device, the combination of an insulating base having four pairs of fuse receiving contacts thereon and having at one end a ledge adapted to support supplemental fuse blocks, four wire terminals at the opposite end of the base electrically connected with the fuse contacts at the said end, and four devices supported by said ledge and having at least a portion thereof accessible from the front of the ledge, the devices being electrically connected with the corresponding fuse contacts, the said devices being arranged in pairs and the devices of each pair being adapted alternatively for the direct electrical and mechanical connection of two wire terminals or for the electrical and mechanical connection of a supplemental fuse block having two fuses.

3. In an electrical distribution device, the combination of an insulating base having fuse receiving contacts thereon and having at one end a ledge adapted to support a supplementary fuse block, wire terminals at the opposite end of the base electrically connected with the fuse contacts at the said end, screws supported by said ledge and accessible from the front thereof, the screws being electrically connected with the corresponding fuse contacts, and a supplemental fuse block at the front of the said ledge having contacts for screw plug fuses and having the center contacts thereof electrically and mechanically connected with the said screws.

4. In an electrical distribution device, the combination of an insulating base having fuse receiving contacts thereon and having at one end a ledge adapted to support a supplementary fuse block, wire terminals at the opposite end of the base electrically connected with the fuse contacts at the said end, devices supported by said ledge and having at least a portion thereof accessible from the front of the ledge, the devices being electrically connected with the corresponding fuse contacts, adapters connected to said devices, and a supplemental fuse block at the front of the said ledge having contacts for screw plug fuses and having the center contacts thereof electrically and mechanically connected with said adapters.

5. In an electrical distribution device, the combination of an insulating base having fuse receiving contacts thereon and having at one end a ledge adapted to support a supplementary fuse block, wire terminals at the opposite end of the base electrically connected with the fuse contacts at the said end, screw threaded devices supported by the ledge and projecting from the front thereof, the devices being electrically connected with the corresponding fuse contacts, screw threaded adapters connected to said devices, and a supplemental fuse block at the front of the said ledge having contacts for screw plug fuses and having the center contacts thereof electrically and mechanically connected with said adapters.

6. In an electrical distribution device, the combination of an insulating base having four pairs of fuse receiving contacts thereon and having at one end a projecting ledge, the said base being provided with two transverse grooves in the rear adjacent the said ledge, four wire terminals at the opposite end of the base electrically connected with the fuse contacts at the said end, four electrical connecting devices supported by said ledge and having at least a portion thereof accessible from the front of the ledge, the devices being electrically connected with the corresponding fuse contacts, and two transverse conductors located in the respective grooves in the base and each electrically connected with two of the said electrical connecting devices.

7. In an electrical distribution device, the combination of an insulating base having four pairs of fuse receiving contacts thereon and having at one end a ledge adapted to support supplemental fuse blocks, four wire terminals at the opposite end of the base electrically connected with the fuse contacts at the said end, four devices at the front of the said ledge and extending therethrough, the devices being electrically connected with the corresponding fuse contacts and being arranged in pairs and the devices of each pair being adapted alternatively for the direct electrical and mechanical connection of two wire terminals or for the electrical and mechanical connection of a supplemental fuse block having two fuses, and two conductors at the rear of said ledge, each being electrically connected with two of said devices at the rear of the ledge.

8. In an electrical distribution device, the combination of an insulating base having four pairs of fuse receiving contacts thereon and having at one end a projecting ledge, the said base being provided with two transverse grooves in the rear adjacent the said ledge, four wire terminals at the opposite end of the base electrically connected with the fuse contacts at the said end, four electrical connecting devices at the front of the said ledge and extending therethrough and electrically connected with the corresponding fuse contacts, and two transverse conductors located in the respective grooves in the base and each electrically connected with two of the said electrical connecting devices at the rear of the ledge.

JOSEPH SACHS.